March 26, 1940. J. A. STADTFELD 2,194,775
BEVERAGE DISPENSER AND CARBONATOR
Filed Sept. 22, 1937
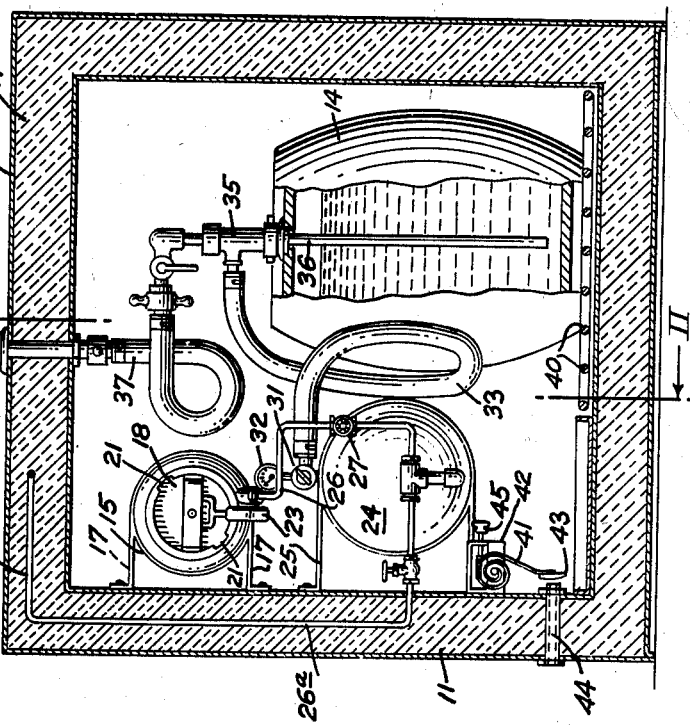
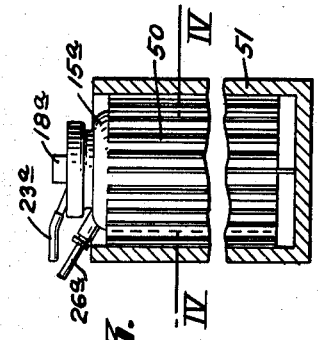
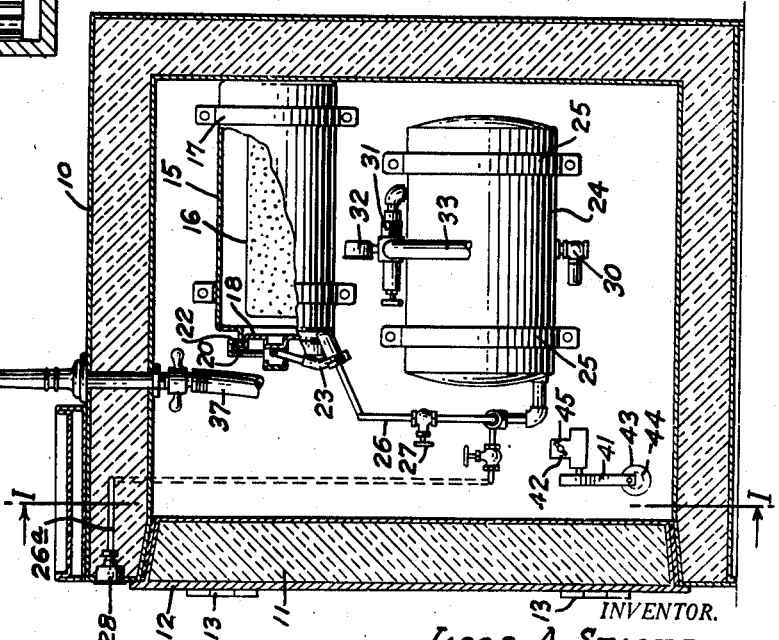
INVENTOR.
JACOB A. STADTFELD
BY Owen and Hardy
ATTORNEYS.

Patented Mar. 26, 1940

2,194,775

UNITED STATES PATENT OFFICE 2,194,775

BEVERAGE DISPENSER AND CARBONATOR

Jacob A. Stadtfeld, San Francisco, Calif., assignor to Donald Colvin, San Francisco, Calif.

Application September 22, 1937, Serial No. 165,069

3 Claims. (Cl. 225—21)

This invention relates to a beverage dispensing device and more particularly to such devices wherein the pressure for dispensing as well as the material for carbonation is generated by the sublimation of solid phase carbon dioxide.

It is an object of the present invention to provide a unit which may be used for dispensing and cooling various types of beverages and liquids wherein there are no coils or other intricate and difficult apparatus to be cleaned; to provide such a device as this which is entirely self-contained, and has a low cost of operation; to provide such a device wherein there are no moving parts to wear, cause trouble or require replacement.

The present device finds particular utility in connection with cooling such beverages as beer. It is an object of the present invention therefore to provide a device for the dispensing of beer wherein an entire keg of beer can be kept cooled and at even proper temperature within the device itself rather than subjecting the beer keg to improper temperatures and relying upon cooling in coils on the way to the dispensing valve; also to keep the beer in better condition and flavor by dispensing it in proper condition directly from the keg.

Further objects are to provide a construction of maximum simplicity, economy and ease of assembly and such further objects, advantages and capabilities as will later more fully appear and as are inherently possessed thereby.

The invention further resides in the combination, construction, and arrangement of parts illustrated in the accompanying single sheet of drawings and while it is shown therein a preferred embodiment and a modification it is to be understood that the same is capable of other modifications and changes and comprehends other details and constructions without departing from the spirit or the scope of the invention.

Referring to the drawing;

Fig. 1 is a vertical section taken on the line I—I of Fig. 2 and looking in the direction of the arrows.

Fig. 2 is a vertical section taken on a line II—II of Fig. 1 and looking in the direction of the arrows.

Fig. 3 is a detail of a modified form of the carbon dioxide container.

Fig. 4 is a transverse section taken on the line IV—IV of Fig. 3.

Similar parts in the drawing and in the description of the invention that follows are designated by the same reference characters.

Referring more particularly to the drawing, describing the preferred embodiment of the invention, 10 refers to a double walled container or box which is preferably filled with a suitable insulating material 11 on all six sides, thus providing a well-insulated container. No particular shape of container is required but preferably it should be large enough so that an entire keg may be contained therein and low enough so the keg can be placed therein without difficulty. Ordinary ice boxes or refrigerators may be used to make the container 10 when modified to meet the present condition. The container 10 is provided with a door 12 in the front thereof suitably hinged as at 13 and the arrangement is preferably made in this way in order to permit the placing of the keg 14 therein with the minimum effort of lifting and the like. The door 12 is likewise double walled and insulated with suitable material 11.

Inside of the container 10 is positioned a smaller container 15 for holding dry ice or solid carbon dioxide 16 and may be of any convenient or desirable shape. The container 15 is so constructed as to be capable of withstanding pressure up to one hundred and fifty pounds (150) per square inch. The closure means must be air and pressure tight and in the form shown herein comprise a cap 18 having ears 20 which slip into key ways 21 at the lip of the container thus locking the cap 18 in position. Manual pressure on the handle 23 further seals the container making it air and pressure tight. Adjacent the container 15 is temperature equalizing and pressure storage chamber 24 positioned within the device 10 and held in place by brackets 25 or any other convenient means. Leading from the carbon dioxide container 15 to the chamber 24 is a connecting line 26 having a control valve 27. An extension 26a of the line 26 leads within the insulated walls of the container 10 to a pressure gage 28 the dial of which may be read from outside of the container without opening the door 12.

When dry ice or solid carbon dioxide is confined it will build up an indefinite pressure and therefore a safety valve 30 is provided which can be set for any desired pressure. The chamber 24 is provided with a suitable valve outlet 31 which has a pressure gage 32 registering the pressure of the stored gas within the container 24 at the point of delivery. From this outlet 31 leads a flexible tubing 33 which connects with the coupling of a Peerless tap 35 through which pressure is built up in a keg 14. Liquid is withdrawn from the keg 14 through the tube 36 and through the flexible tubing 37 to the dispensing faucet 38 outside of the container 10. The keg 14 rests on a suitable grating 40 in order to save the finish of the inside of the device.

Also located within the device is a temperature control means. This consists of a spiral metal expansion coil 41, one end of which is secured to bracket 42, and the other end of which has mounted thereon a pad 43 adapted to seal the vent 44 which extends entirely through the side wall of the container 10. The temperature in the container 10 is regulated by changing the position of the coil, controlled by the key 45, to permit more or less communication with the outside air.

In Figs. 3 and 4 there is shown a modification of the present invention in which a solid carbon dioxide container 15a and also preferably the control tank 24 are disposed in vertical position within the container 10 rather than horizontal position as is shown in Figs. 1 and 2 of the drawing. In addition the solid carbon dioxide container 15a is provided with external radial fins 50 and the entire container is adapted to be inserted and held within an outer container 51 open at the top which is filled with water. As will be further described in the operation, the water jacket soon becomes an ice jacket around the container 15a and greatly promotes and prolongs refrigeration. There is very little loss of water from evaporation and one filling is sufficient for a considerable period of operation.

In operation solid carbon dioxide is placed within the closed container 15, or 15a in the modification of Figs. 3 and 4. Upon sublimation, the solid carbon dioxide changes at once from the solid phase to the gaseous phase without residue. This builds up the pressure, since the volume of the gaseous phase is approximately 500 times that of the solid phase. The gas under pressure passes through line 26 to the temperature equalizing and pressure storage tank 24. The pressure in line 26 is commmunicated through line 26a and is indicated on the dial of the gage 28. It has been a very grave difficulty with previous containers of the general type that the gas under pressure so created by the sublimation of the solid carbon dioxide was conveyed almost directly to the liquid to be dispensed or carbonated. Solid carbon dioxide has a temperature of about −110° F. and likewise the gas passing through the line 26 has a similar temperature. By passing the generated gas into the tank 24 it is permitted to equalize in temperature to some extent with that of the air within the box so that freezing of the beverage or liquid will not occur. The tank 24 is also a pressure storage tank so that in the event the supply of solid carbon dioxide becomes exhausted the operation will continue for as long a period as there is reserve pressure stored in tank 24.

The maintenance of the temperature within the box is controlled by the temperature regulating means and particularly the spiral expansion 41, which is of the type usual in thermostats employing two metals having different coefficients of expansion. This metal coil is so sensitive that it will respond to temperature which is within a tolerance of one or two degrees. If the air in the box becomes too cold, coil 41 will lift the pad away from the vent 44, and permit air from the outside to enter therein. As soon as the air on the inside has been warmed to the extent desired in accordance with the setting the coil 41 presses the pad against the opening of the vent 44 and thus closes off the entry of warmer air from the outside.

Pressure caused by the sublimation of the dry ice may be built up in the tank 24 retained therein by control valve 27 even after exhaustion of the ice in the container 15. The pressure at the point of release from the tank 24 may be controlled by the valve 31 and registered by gage 32. Thus the gas leaving container 24 will always be at a constant pressure and temperature. The gas under the constant pressure passes through the flexible line 33 to the Peerless tap 35 and into contact with the surface of the liquid within the keg 14 or any other suitable container. Since beer is already highly carbonated sudden liberation and agitation are not here desired or required and gas is allowed to flow into the container 14 slowly and at a pressure only high enough to force the beverage up through the tube 36 and out the dispensing nozzle 38.

The form of device shown as modified in Figs. 3 and 4 operates in precisely the same manner except that water is admitted around the outside of the container 15a. Radial fins 50 aid in the heat transference, and the water freezes. The ice so created acts to insulate the $CO_2$ container 15a from the interior of box 10, and extends to an appreciable degree, the length of time required to use up the solid carbon dioxide. A similar result may be obtained by changing the setting of the thermostat coil 41.

To use the device as a carbonator for water, wine, syrup mixed with water and the like, all that is necessary is to adjust the valve 31 to allow the pressure to approximately 75 pounds per square inch. While the pressure is being thus built up, the beverage in the container 14 is being cooled which aids the carbonating of liquids. As soon as the maximum pressure has been so built up then it is released by opening the valve 31 and discharged into the cooled liquid.

I claim:

1. In a beverage cooling apparatus, an insulated cabinet, a beverage receptacle containing beverage to be dispensed located within said cabinet, a beverage withdrawal conduit communicating the beverage below its liquid level with a dispensing orifice located exteriorly of said cabinet, a combined cooling and pressure forming element located within said cabinet and adapted to contain solid carbon dioxide, a combined carbon dioxide gas storage chamber and heat exchanger located within said cabinet, a conduit connecting said combined cooling and pressure forming element with said combined gas storage chamber and heat exchanger, a conduit connecting said latter element and said beverage container above the level of liquid therein, thermostatic means for communicating the ambient exterior of said cabinet to the ambient interior thereof and in heat exchange relation with said heat exchanger to increase the temperature of the gaseous carbon dioxide therewithin as required, whereby the beverage within the beverage container will be cooled to the proper temperature and its dispensing facilitated.

2. The structure recited in claim 1, a jacket surrounding said cooling and pressure forming element adapted to container water which may be frozen to form a hold-over medium.

3. A beverage cooling and dispensing apparatus including an insulated chamber, a pressure tight solid carbon dioxide container located therewithin, a beverage contained within said chamber, a combined carbon dioxide gas reservoir and heat exchanger, conduit means connecting said solid carbon dioxide container with said combined element and a conduit connecting said combined element with said beverage container, means for adding heat to said heat exchanger, and means for communicating beverage below its liquid level in said container to a discharge orifice exterior thereof, whereby the beverage within said container will be cooled to the proper temperature and its dispensing facilitated.

JACOB A. STADTFELD.